United States Patent [19]

Inoue

[11] Patent Number: 4,574,834
[45] Date of Patent: Mar. 11, 1986

[54] PASSAGE MEANS FOR HYDRAULIC UNIT
[75] Inventor: Hidehumi Inoue, Ohmiya, Japan
[73] Assignee: Jidosha Kiki Co., Ltd., Tokyo, Japan
[21] Appl. No.: 630,452
[22] Filed: Jul. 11, 1984
[30] Foreign Application Priority Data Jul. 25, 1983 [JP] Japan .................. 58-115265[U]

[51] Int. Cl.⁴ .................. B60T 8/26; B60T 11/34
[52] U.S. Cl. .................. 137/505.25; 92/162 R; 137/513.5; 303/6 C
[58] Field of Search ............. 137/505, 505.25, 533.21, 137/533.25, 513.5; 303/6 C; 92/162 R, 162 P

[56] References Cited
U.S. PATENT DOCUMENTS

| | | | |
|---|---|---|---|
| 2,056,249 | 10/1936 | Bystricky | 137/513.5 X |
| 3,430,613 | 3/1969 | Barnes | 137/513.5 X |
| 3,709,563 | 1/1973 | Shellhause | 137/513.5 X |
| 3,977,731 | 8/1976 | Kasahara | 303/6 C |
| 4,070,644 | 1/1978 | Shellhause | 303/6 C X |
| 4,415,001 | 11/1983 | Kent | 137/505.25 X |
| 4,475,339 | 10/1984 | Inoue | 303/6 C X |
| 4,481,969 | 11/1984 | Fallon et al. | 137/505.25 X |

Primary Examiner—Martin P. Schwadron
Assistant Examiner—Stephen M. Hepperle
Attorney, Agent, or Firm—Flynn, Thiel, Boutell & Tanis

[57] ABSTRACT

Passage means is provided for a hydraulic unit, in particular, a hydraulic unit including a plunger slidably fitted in a housing, a chamber formed with the housing and having a wall surface against which the plunger may abut, and a flow path opening into the surface which may be abutted by the plunger for communication with the chamber. The passage means is effective to maintain a communication between the chamber and the flow path. In accordance with the invention, a cap, which is separate from the plunger, is formed with a communication path and is fitted over the plunger to maintain a communication between the chamber and the flow path therethrough.

7 Claims, 3 Drawing Figures

PASSAGE MEANS FOR HYDRAULIC UNIT

FIELD OF THE INVENTION

The invention relates to passage means for hydraulic unit, and more particularly, to passage means for use in a hydraulic unit including a plunger slidably fitted in a housing, a chamber formed within the housing and having a wall surface against which the end face of the plunger is adapted to abut, and a flow path opening into the wall surface against which the plunger abuts for communication with the interior of the chamber, the passage means serving to maintain a communication between the chamber and the flow path.

DESCRIPTION OF THE PRIOR ART

In an arrangement in which the end face of a plunger may abut against a wall surface to close the opening of a flow path which opens into the wall surface, if it is desired to maintain a communication between a chamber, partly defined by the wall surface, and the flow path, it is a common practice to form a radially extending slit in the end face of the plunger through which a communication is maintained between the chamber and the flow path. Such a slit is formed by a milling operation, which must be performed separately from a lathe operation which is used to produce the plunger, requiring an additional machining step to cause an increased cost.

SUMMARY OF THE INVENTION

It is an object of the invention to provide inexpensive means which maintains a communication between the chamber and the flow path, without requiring a radially extending slit to be formed in the plunger.

In accordance with the invention, a cap, which is separate from the plunger, is formed with a communication path and is fitted over the plunger to enable a communication between the chamber and the flow path to be maintained through the communication path. While such an arrangement increases the number of parts by the addition of the cap, the overall cost will be reduced as compared with a formation of a slit in the plunger, since such cap can be easily manufactured by a press operation.

Above and other objects, features and advantages of the invention will become apparent from the following description with reference to the drawings.

DETAILED DESCRIPTION OF THE EMBODIMENT

Figure 1:
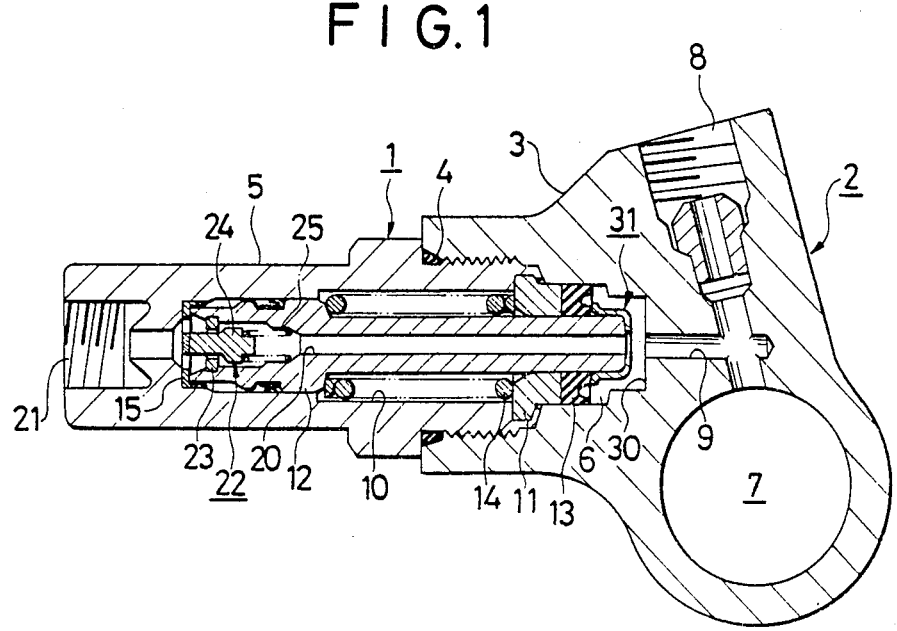
FIG. 1 is a longitudinal section of one embodiment of the invention.

Referring to the drawings, an embodiment of the invention will be described below which illustrates the application of the invention to a brake liquid pressure regulation valve which is known in itself. In FIG. 1, the regulating valve includes a housing 1 which comprises a housing portion 3 which serves as a housing for a master cylinder 2, and a cylindrical housing 5 which is threadably engaged with the housing portion 3 with a seal member 4 interposed therebetween to maintain liquid tightness.

In the region where the pair of housings 3 and 5 are threadably engaged with each other, there is defined an input chamber 6. The master cylinder 2 is formed with a pressure chamber 7 in which a brake liquid pressure is developed in response to the depression of a brake pedal, not shown. Thereupon, the brake liquid pressure is directly fed through an output port 8 to a front wheel cylinder, not shown, and is also fed to the input chamber 6 of the regulating valve through a flow path 9 formed within the master cylinder 2.

The cylindrical housing 5 is axially formed with a stepped bore 10 which extends therethrough. A cover 11 is crimped to the end of the housing 5 which is located adjacent to the master cylinder. A stepped plunger 12 is slidably fitted in the bore 10 and has its portion of reduced diameter disposed nearer the master cylinder 2, with the free end thereof extending into the input chamber 6 by slidably extending through a seal member 13 which maintains liquid tightness of the input chamber 6. A spring 14 is interposed between the cover 11 and the step formed in the plunger 12 and normally urges the plunger 12 to its nonoperative position shown where it abuts against a plate 15 which is fitted within the bore 10.

A passage 20 is formed in alignment with the axis of the plunger 12 so as to extend therethrough. The passage 20 communicates with an output port 21 formed in the housing 10, and a check valve 22 is disposed within the passage 20 toward the output port 21. The check valve 22 comprises a valve seat 23 formed around the passage 20, a valve element 24 adapted to seat upon the valve seat 23 from the side nearer the master cylinder 2, and a spring 25 urging the valve element 24 into seating engagement with the valve seat 23. It is to be noted that the resilience of the spring 25 is chosen to be less than that of the spring 14 so that in the non-operative position of the plunger 12 where it abuts against the plate 15, the valve element 24 also abuts against the plate 15 so as to cause the valve element 24 to be disengaged from the valve seat 23 against the resilience of the spring 25.

The brake liquid pressure regulating valve mentioned above is essentially conventional in construction. A brake liquid pressure which is introduced into the input chamber 6 from the pressure chamber 7 through the flow path 9 passes through the passage 20 formed within the plunger 12, the clearance between the valve element 24 and the valve seat 23 and the output port 21 to be supplied to a rear wheel cylinder, not shown. When the liquid pressure rises and exceeds a given value, a difference in the area of pressure-responsive surfaces of the plunger 12 which are located toward the output port 21 and toward the input port 6, respectively, causes the plunger 12 to move to the right, thus closing the check valve 22 to cease a rise in the liquid pressure supplied to the rear wheel cylinder.

Subsequently when the liquid pressure in the input chamber 6 further rises, the plunger 12 moves in a reciprocating manner in accordance with the pressure rise, as is well known in the art, thus increasing the liquid pressure supplied to the rear wheel cylinder at a reduced rate of increase as compared with the rate of increase in the liquid pressure supplied to the front wheel cylinder in accordance with proportion of the area of pressure-responsive surfaces. It will be noted that the spacing between the right-hand end face of the plunger 12 and the wall surface 30 of the input chamber 6 is chosen to be greater than the magnitude of a stroke which is required for the valve element 24 to seat upon the valve seat 23 of the check valve 22. However, since such spacing is maintained at its minimum value in order to achieve a reduced size of the regulating valve and since the flow path 9 is formed in alignment with the axis of the plunger 12 because of the ease of machineability, there is a possibility that the right-hand end face of the plunger 12 may abut against the wall surface 30 to close the opening of the flow path 9 into the input chamber 6. To accommodate for this, a radially extending slit is formed in the right-hand end face of the plunger 12, as mentioned previously, to prevent the plunger 12 from closing the opening of the flow path 9 in the prior art practice.

Figure 2A:
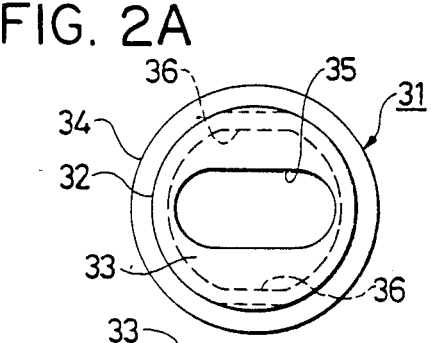
FIGS. 2(a), (b) and (c) are a plan view, a side elevation and a fragmentary section of the cap shown in FIG. 1.
Figure 2C:
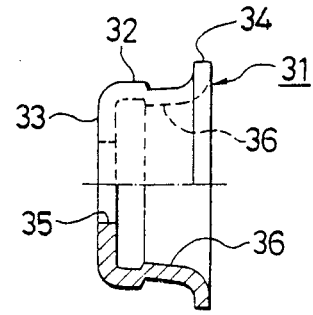
Figure 2B:
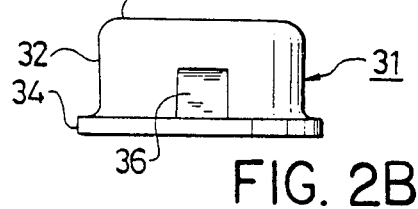

However, in the embodiment shown, a cap 31 is fitted over the right-hand end of the plunger 12, and this cap 31 is formed with a communication path which maintains a communication between the input chamber 6 and the flow path 9. As shown in FIGS. 2(a) to (c), the cap 31 includes a cylindrical portion 32, a wall 33 which extends radially inward from one end of the cylindrical portion 32, and a flange 34 extending radially outward from the other end of the cylindrical portion 32. The wall 33 is formed with an elliptical communication hole 35 therein extending lengthwise close to the inner periphery of the cylindrical portion 32. The cylindrical portion is formed with a pair of radially inward bulges 36 which are located diametrically opposite to each other. The communication hole 35 is positioned so as to be aligned with the opening of the flow path 9 when the plunger 12 is driven to the right and the cap 31 abuts against the wall surface 32.

Figure 3:
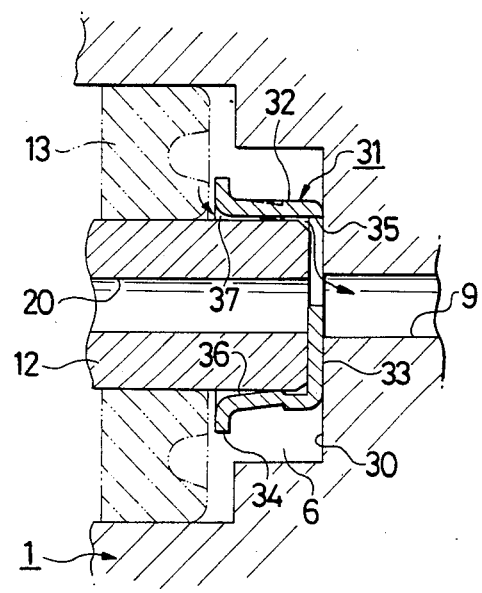
FIG. 3 is an enlarged cross section of part of the arrangement shown in FIG. 1, illustrating a different condition.

Accordingly, when the cap 31 is fitted over the right-hand end of the plunger 12, the bulges 36 are press fitted over the outer periphery of the plunger 12 to connect the both members together, as illustrated to an enlarged scale in FIG. 3, and the bulges form a clearance between the inner periphery of the cylindrical portion 32 and the outer periphery of the plunger 12. It will be seen that on one side, the clearance communicates directly with the input chamber 6, and on the other side, it is maintained in communication with the communication hole 35 which is positioned so as to be aligned with the opening of the flow path 9. As a result, there is defined a communication path 37 in the cap 31 which maintains a communication between the input chamber 6 and the flow path 9.

It is to be noted that the cap 31 described above can be easily formed by a press operation, and hence the separate provision of the cap 31 is less expensive than the machining cost required to form the slit mentioned before.

In the conventional construction, a snap ring has been fitted around the plunger 12 to prevent the seal member 13 from being disengaged during the disassembly or assembly of the regulating valve. However, in the present embodiment, the flange 34 also serves as a snap ring, thus further reducing the total manufacturing cost.

It is noted that the communication path 37 defined by the cap is not limited to the specific construction mentioned above. For example, if the strength requirement permits, it may comprise a slit extending from the wall surface 33 into the cylindrical portion 32. Alternatively, an uneven groove may be formed in the cap to define a communication path. A cap of these alternative constructions can also be easily formed as by a press operation. While the embodiment has been described as applied to a brake liquid pressure regulating valve, it should be evident that the invention is equally applicable to other uses where a plunger may close a passage.

While an embodiment of the invention has been specifically shown and described, a number of changes, modifications and substitutions therein will readily occur to one skilled in the art, and therefore it should be understood that the invention is solely defined by the appended claims.

What is claimed is:

1. Passage means for hydraulic unit including a plunger slidably fitted in a housing, a chamber formed within the housing and having a wall surface against which the end face of the plunger may abut, and a flow path opening into the wall surface which may be abutted by the plunger and communicating with the interior of the chamber; the passage means comprising a cap fitted over the end of the plunger, the cap being formed with a communication path which maintains a communication between the chamber and the flow path, the cap comprising a cylindrical portion fitted over the plunger, a wall extending radially inward from one end of the cylindrical portion, and a communication hole formed to extend through the wall and forming part of the communication path, the cylindrical portion being formed with a radially inward bulge which is a press fit around the plunger and thereby secures the cap to the plunger, said bulge also defining a clearance between said cylindrical portion and plunger and thereby forming said communication passage between said cap and plunger.

2. Passage means according to claim 1, in which the communication hole is elliptical and is of sufficient length along its long axis to extend close to the inner periphery of the cylindrical portion, said cylindrical portion being formed with a pair of said radially inward bulges, said bulges being located diametrically opposite to each other.

3. Passage means according to claim 2, in which said diametrically opposed pair of bulges are located substantially along the narrow axis of said elliptical communication hole, said bulges being spaced circumferentially from the ends of said elliptical communication hole.

4. Passage means according to clam 1, in which said clearance on one side communicates directly with said chamber and on the other side is maintained in communication with said communication hole, said clearance extending axially along a portion of said plunger.

5. The apparatus of claim 1, in which the hydraulic unit includes an annular seal interposed radially between the plunger and housing to close the end of said chamber remote from said wall surface, said cap also preventing said seal member from being removed unintentionally from the end of said plunger past said end face of said plunger.

6. Passage means for hydraulic unit including a plunger slidably fitted in a housing, an output chamber and an input chamber defined within the housing on the opposite sides of the plunger, a flow path formed within the housing and opening into the input chamber in alignment with the plunger, the plunger including an increased diameter portion disposed toward the output chamber and having an increased area of pressure-responsive surface and a reduced diameter portion disposed toward the input chamber and having a reduced area of pressure-responsive surface, a spring effective for normally maintaining the plunger at its non-operative position, a passage providing a communication between the input and the output chamber, and a check valve disposed within the passage and operative to open the passage in the non-operative position of the plunger and to close the passage when the plunger is operated; the passage means comprising a cap fitted over the end of the plunger which is located adjacent to the input chamber, the cap being formed with a communication path which maintains a communication between the input chamber and the flow path, the cap comprising a cylindrical portion fitted over the plunger, a wall extending radially inward from one end of the cylindrical portion, and a communication hole formed to extend through the wall and forming part of the communication path, the cylindrical portion being formed with a radially inward bulge which is a press fit around the plunger and thereby secures the cap to the plunger, said bulge also defining a clearance between said cylindrical portion and plunger and thereby forming said communication passage between said cap and plunger.

7. The apparatus of claim 6, in which the hydraulic unit includes an annular seal interposed radially between the plunger and housing to close the end of said input chamber remote from said flow path, said cap also preventing said seal member from being removed unintentionally from the end of said plunger past said end face of said plunger.

* * * * *